July 19, 1955 E. J. LOMAZZO 2,713,283
MACHINE TOOL
Filed May 18, 1946 7 Sheets-Sheet 3
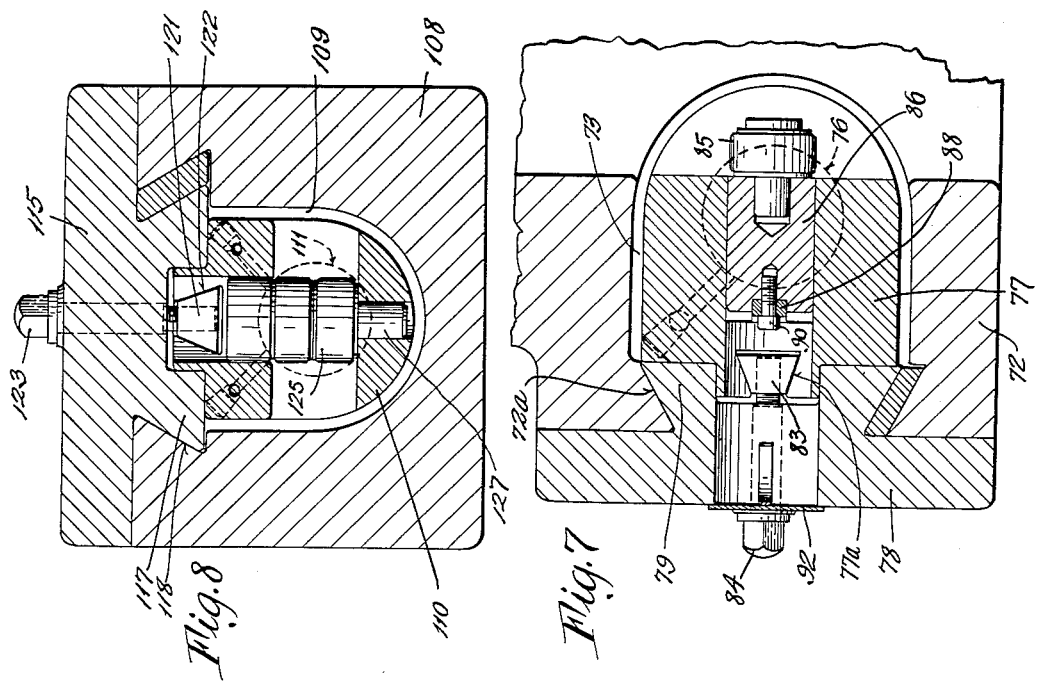
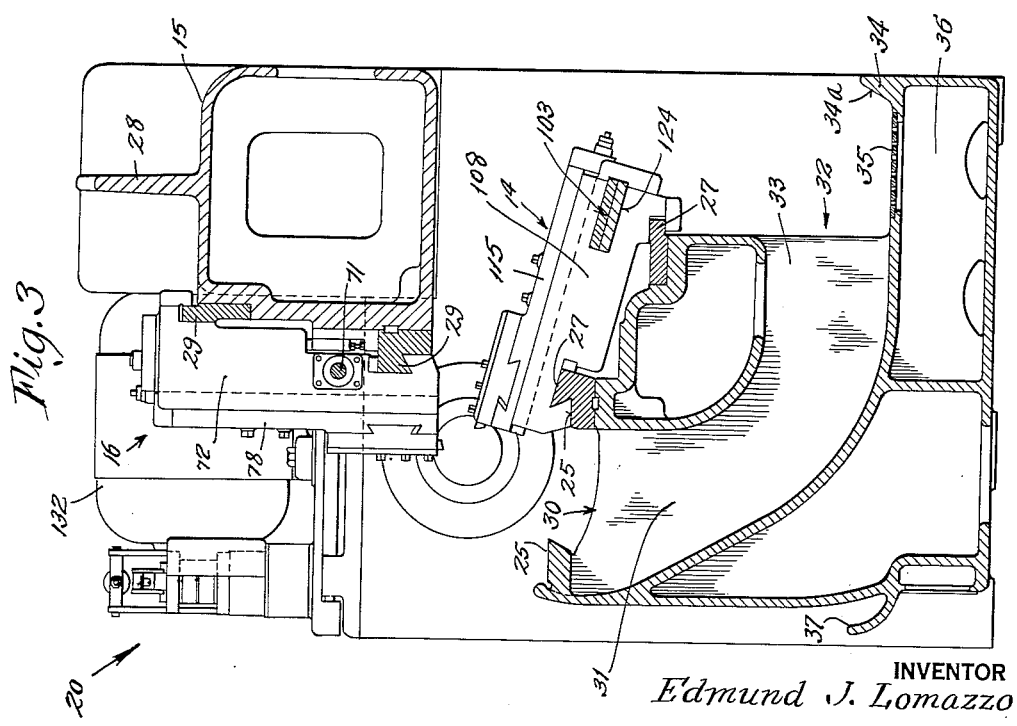
INVENTOR
Edmund J. Lomazzo
BY
Johnson, Kline and Hensel
ATTORNEYS

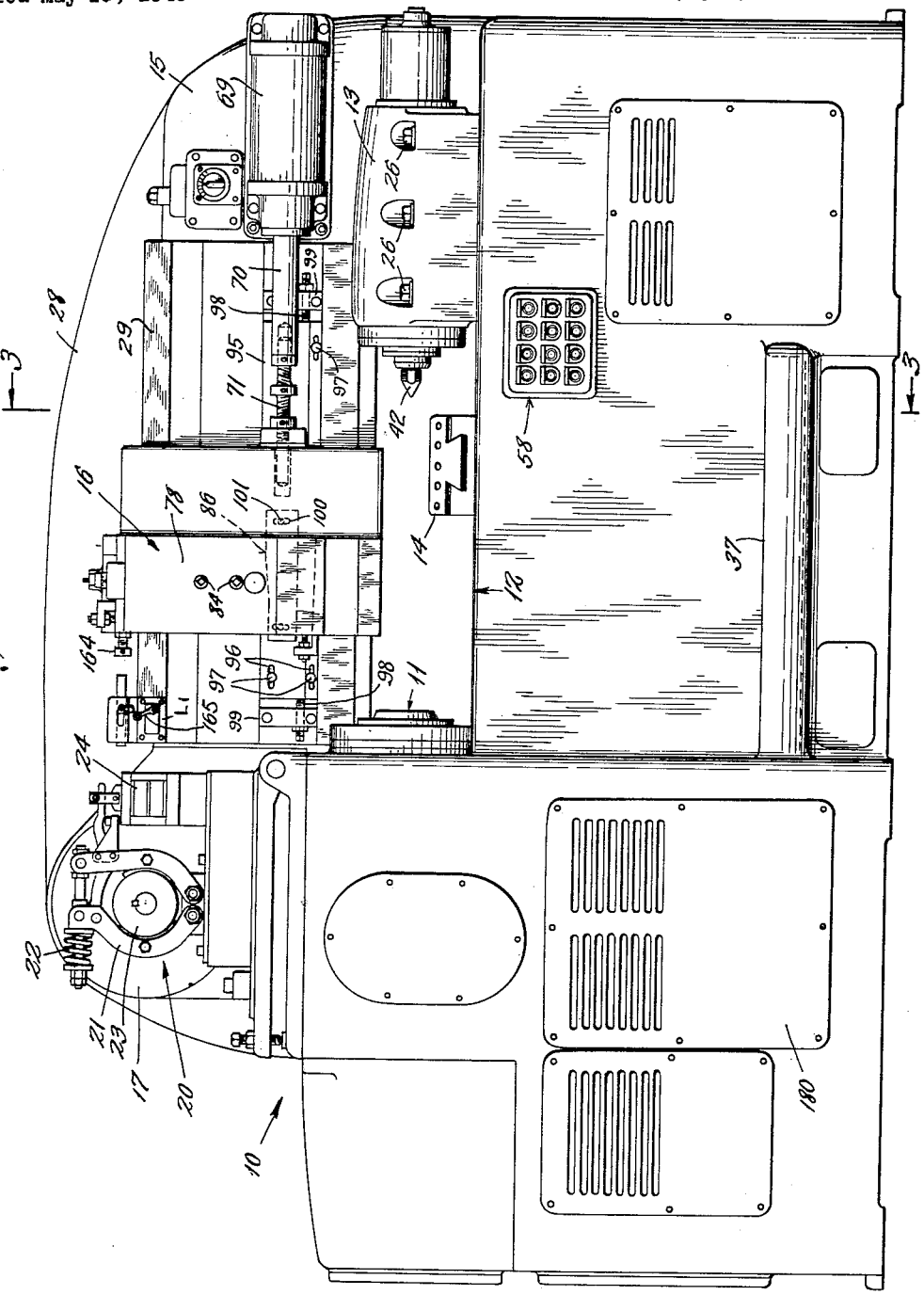

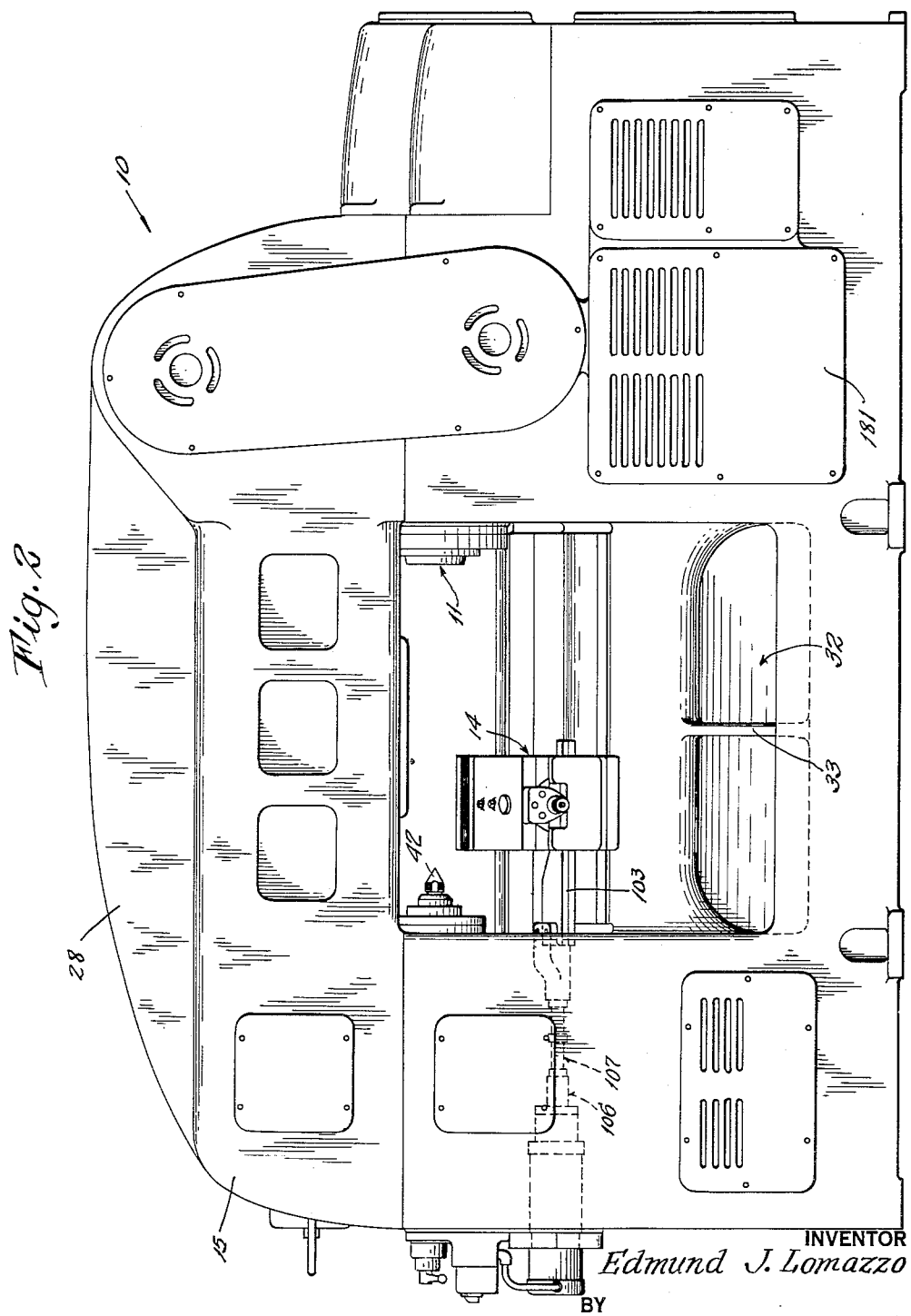

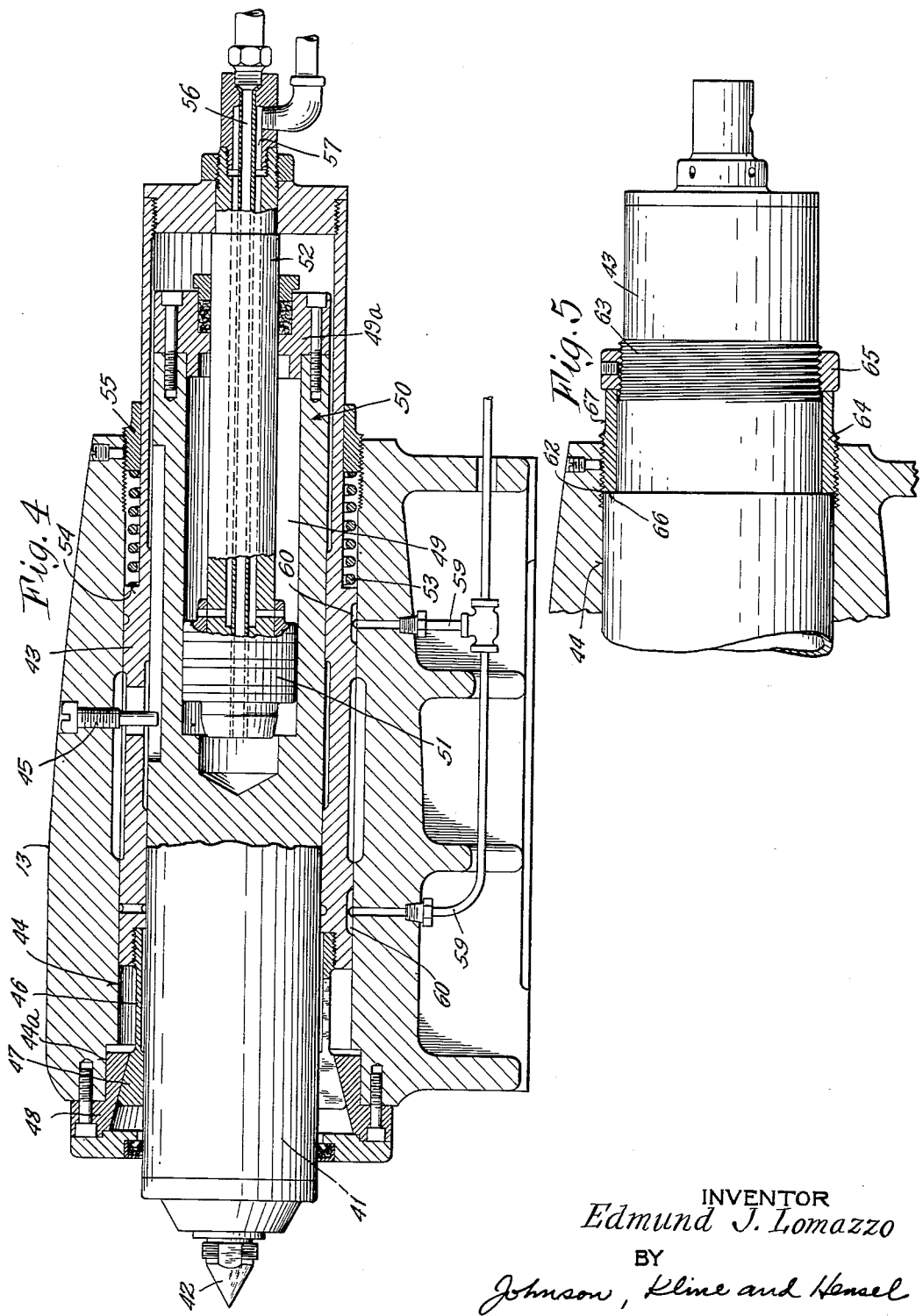

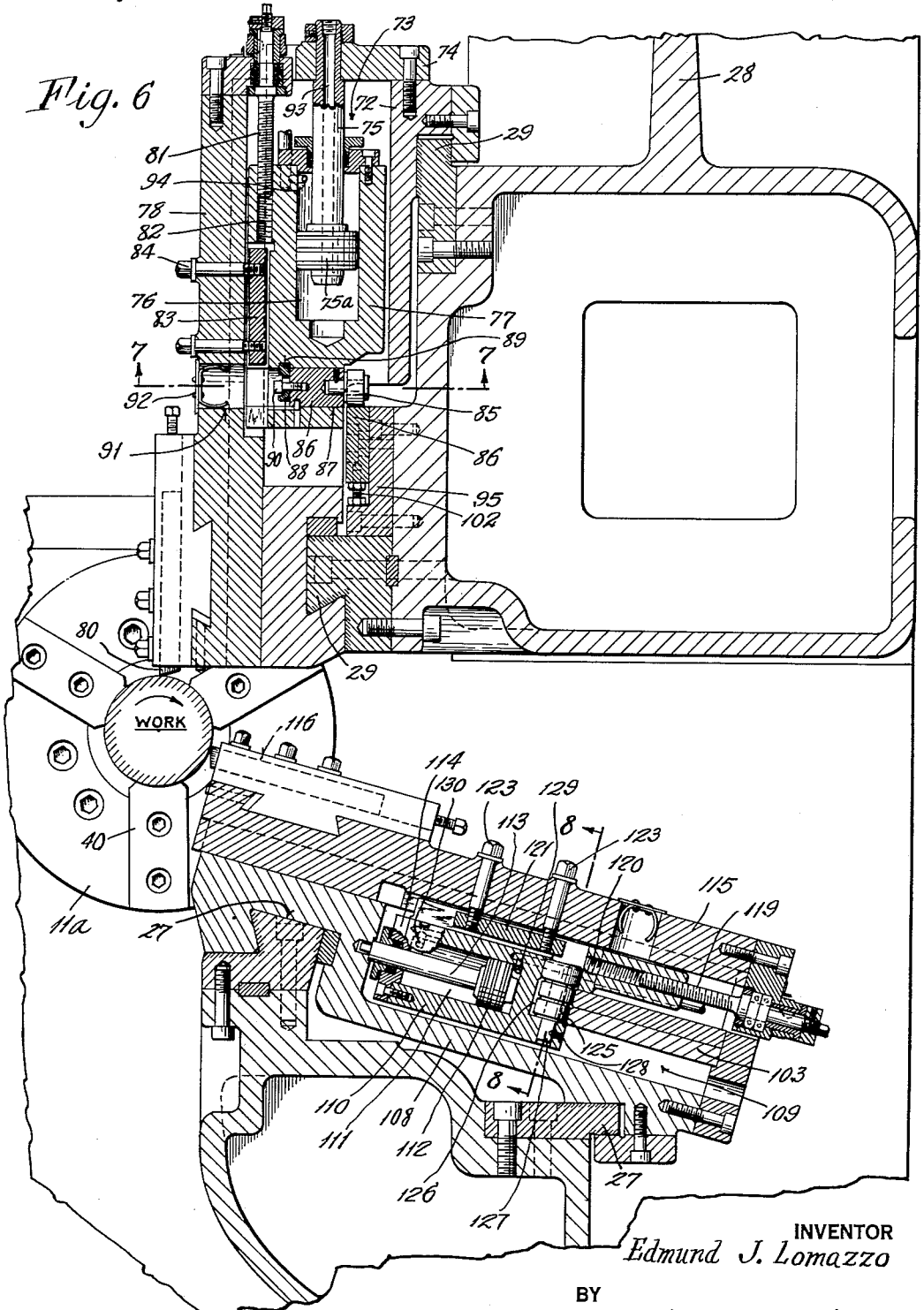

July 19, 1955  E. J. LOMAZZO  2,713,283
MACHINE TOOL
Filed May 18, 1946  7 Sheets-Sheet 7

INVENTOR
Edmund J. Lomazzo
BY
Johnson, Kline and Hensel
ATTORNEYS

United States Patent Office 2,713,283
Patented July 19, 1955

2,713,283

MACHINE TOOL

Edmund J. Lomazzo, Norwalk, Conn., assignor to The Hydra-Feed Machine Tool Corporation, a corporation of Connecticut Application May 18, 1946, Serial No. 670,794

9 Claims. (Cl. 82—21)

This invention relates to a machine tool and particularly to a semiautomatic lathe for high production work.

The lathe of the present invention includes a novel bed and carriage arrangement wherein the working space for receiving workpieces is unobstructed, whereby the workpieces may be more readily inserted and removed from the machine and, if the workpieces are of such size as require conveying means, they may be brought into position without interference. Also, the bed is provided with a chip and coolant removal means extending for the full length of the working space for conducting the chips from the working space to the back of the machine for removal therefrom.

The carriage structures of the present invention include a novel hydraulic control for the tool slide, whereby the tool slide is yieldingly held in engagement with the controlling cam throughout its operation.

A feature of the present invention is a novel hydraulic system for operating the top carriage and rear cross slides during a cutting cycle wherein the carriages are connected in dependent relation during the cutting stroke and for independent operation during the return stroke.

Another feature of the present invention resides in the improved work holding system wherein the tailstock is provided with adjustable bearings for taking up wear in the spindle and in which the tailstock spindle is automatically moved to work engaging position with a predetermined pressure on the work, may be automatically locked in said position by the adjustable bearing, and the work chucked by the chucking means in predetermined sequence.

In accordance with the present invention the lathe is provided with a novel manually operated semiautomatic electrohydraulic system for controlling the operation of each of the various elements of the lathe such as the hydraulic pump, the spindle drive, the work holding means, the feeding cycle and other necessary operations of the machine. This novel system greatly simplifies the number of elements required for the operational control of the lathe and insures constant supervision of the work by the operator. Suitable interlocks are provided within the system for preventing improper operation of the separately controlled instrumentalities.

Other features and advantages of the present invention will be apparent from the specification and claims when considered in connection with the drawings in which:

Fig. 1 is a front view of the machine.

Fig. 2 is a back view of the machine.

Fig. 3 is a sectional view of the machine taken along line 3—3 of Fig. 1.

Fig. 4 is a view partly in section of the tailstock.

Fig. 5 is a view of a modification of the tailstock.

Fig. 6 is a sectional view through the tool carriages.

Fig. 7 is a sectional view taken along the line 7—7 of Fig. 6.

Fig. 8 is a sectional view taken along the line 8—8 of Fig. 6.

Figure 9:
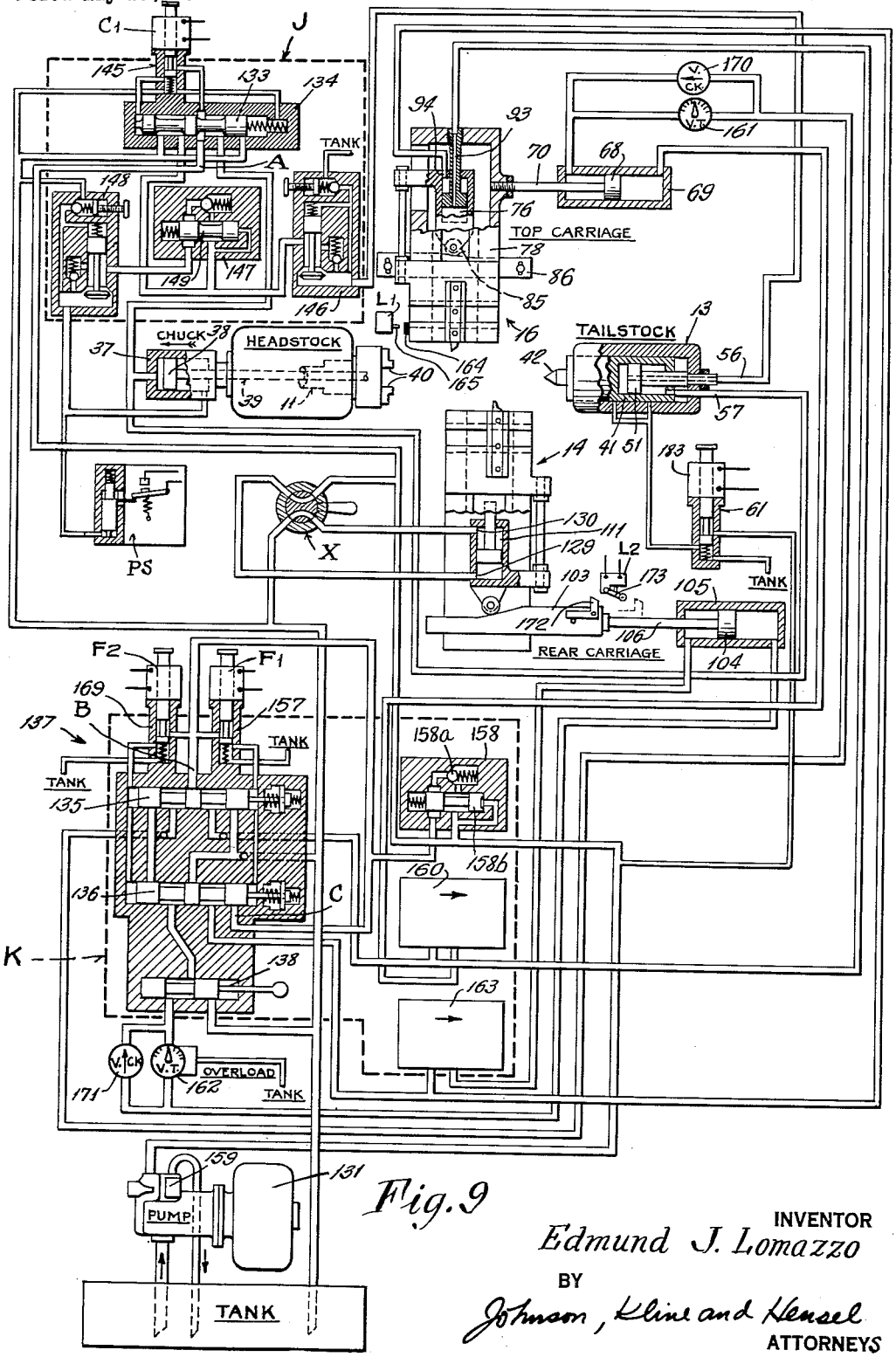
Fig. 9 is the hydraulic diagram for the electrohydraulic control system.

The lathe of the present invention has a frame provided with a pedestal 10 in which is mounted a work chucking and driving spindle 11 and a main bed 12 for supporting a tailstock 13 and a back carriage structure 14, and is provided with a top bed 15 for carrying an overhead tool carriage 16.

With the elements arranged as shown in Figs. 1 to 3, it will be seen that the lathe is entirely open in the front for movement of a workpiece to the work holding means without obstruction by the usual front tool carriage or operating means usually found on such machines. Thus work can be readily moved from a conveying means or other work transporting means (not shown) into work supporting position and may be removed from said position readily so that the machine is particularly well suited for high speed production work.

The work chucking and driving spindle 11 is substantially the same as that shown in the Sparks et al. Patent No. 2,389,746, with the exception that the spindle instead of being driven through a combined clutch and brake is driven directly through suitable gearing (not shown) by an electric motor 17 mounted at the top of the pedestal. In order to arrest the drive of the spindle promptly, a brake 20 having shoes 21 is normally urged into engagement with a drum 23 on the motor shaft by a spring 22. The brake is released by means operated by a solenoid 24 connected in the motor circuit in the usual manner whenever the spindle driving motor is energized.

The main bed is provided with ways 25 on which the tailstock is mounted for adjustment toward and away from the headstock. The tailstock is clamped in adjusted position by means of the bolts 26. The main bed also has ways 27 on which the rear tool carriage slides longitudinally to the required position in which the tool is moved toward and from the workpiece during the cycle of operation on the work.

The top bed 15 is preferably of substantially rectangular cross-section as shown in Figs. 2 and 3 and may have a rib or fillet 28 extending along the top thereof as required. The top bed has on its face a pair of ways 29 for supporting the overhead tool carriage 16 for longitudinal movement along the work as will be described.

The frame with its main bed and top bed may be made from suitable castings or may be fabricated from welded sheet stock as desired and as is shown encloses the hydraulic conduits, wires, motors and pumps and reservoirs for the coolant and hydraulic fluid.

One of the problems encountered in machines of this type is in the removal of chips from around the machine. This problem is solved by the present invention by providing the main bed under the work with an opening 30, Fig. 3, which extends for the full length of the working space for receiving the chips produced during a cutting operation and also for receiving the usual coolant which is projected onto the work during said operation.

This opening is directly below the workpiece so that the chips and coolant drop therethrough by gravity and into the passage 31 which extends downwardly and rearwardly to the back of the machine and terminates in an opening 32 extending across the back of the machine as shown in Fig. 2 through which the chips may be removed. It will be seen that the chips are collected and delivered to a point at which they can be removed into a suitable chip disposal means without requiring stoppage of the machine or without interference with the progress of the work on a workpiece.

If desired, the passage may be provided with one or more reinforcing ribs 33 which, as shown in Fig. 3, tie the main bed together and separate the chip receiving passage into two or more sections which will aid in the distribution of the chips as they fall and prevent them from being dragged or carried to one end of the opening.

In the preferred form of the invention the opening 32 has a lip 34 which prevents the chips and coolant from falling out, the inner surface 34a of the lip being upwardly inclined to aid in chip removal. The bottom of the frame at the lower end of the passage 31 is provided with a strainer 35 through which the coolant may be separated from the chips and pass into a coolant receiving duct 36 to be returned to the coolant supply.

Also, the frame is provided with a trough 37 across the front for collecting any coolant which might run down the front of the main bed and prevents it from running onto the floor. The bed structure is claimed in my copending application Serial No. 51,290, filed September 25, 1948, now Patent No. 2,612,986 issued October 7, 1952.

Work holding means

The present invention includes improved means for quickly and accurately supporting and holding the workpiece in working position. This feature is claimed in my copending application Serial No. 51,288, filed September 25, 1948, now Patent No. 2,614,447 issued October 21, 1952.

The chuck 11a on the driving spindle is hydraulically operated in substantially the same way as in the aforementioned patent. The operating means for the chuck is illustrated in Fig. 9 as a cylinder 37 having a piston 38 reciprocating therein under hydraulic pressure. The piston actuates the draw or chuck rod 39 to close and release the jaws 40 in the usual manner.

The tailstock is provided with a sliding quill 41 having a live center 42 which is mounted in the quill on the usual roller or ball bearings for free rotation therein.

In practice the quill becomes worn through continued use and becomes wobbly and unsteady in the tailstock. The present invention provides a bearing for the quill which will take up the wear and, in one form of the invention, provides for locking the quill in work supporting position.

This bearing is in the form of a sleeve 43 surrounding the quill and in which the quill is slidable. The bearing is slidable in a bore 44 in the tailstock and the quill and sleeve are held against rotation by a key 45. The sleeve has at its forward end a split section 46 forming bearing fingers 47 which cooperate with a cam ring 48 secured in an enlargement 44a of the bore at the front of the tailstock so that the end of the bearing fingers are inwardly deflected by the cam ring to engage and support the quill and take up any wear therebetween.

In the form of the invention shown in Fig. 4 the take-up is automatic and the bearing fingers perform the additional function of automatically locking the quill in work supporting position. In accomplishing this, the quill is provided with a bore 49 at the back end which is closed by the plate 49a and forms the cylinder 50 in which is mounted a piston 51 having a piston rod 52 passing through the plate and fixed to the bearing sleeve. The sleeve is normally urged into the forward position in which the bearing fingers are relieved of pressure against the quill by means of a spring 53 surrounding the sleeve and having one end bearing on the shoulder 54 on the sleeve and the other end engaging the adjusting nut 55 threaded into the tailstock as shown in Fig. 4 and locked by a set screw.

The piston rod has two conduits 56, 57 therein. Conduit 56 passes through the piston and into the head of the cylinder and conduit 57 opens into the rod end of the cylinder. When pressure is applied to conduit 56, the fluid enters the cylinder and acts against the front wall to move the quill and center forward into engagement with the work. When the quill is stopped by engagement with the work, pressure builds up in the cylinder and acts on the piston and moves it and the bearing sleeve backward against the action of the spring until the bearing fingers are tightened about the quill and not only hold it against lateral play but also against longitudinal movement.

A feature of the invention resides in the fact that the pressure of the center against the work can be readily regulated by adjusting the tension in the spring by means of the adjusting nut 55. With the pressure thus regulated danger of jamming or damaging the bearings by undue pressure on the center is eliminated for the quill will always be locked in position in which the pressure on the work is only that necessary to overcome the spring, and any increased pressure in the cylinder cannot be transmitted, due to the locking of the quill, to increase the pressure of the center against the work.

After the quill has been locked, the pressure which is built up in the cylinder will cause the sequence valve 147 (Fig. 9) to operate and connect pressure to the rod end of the chucking cylinder 37 which causes the piston 38 to move the chuck jaws 40 into work holding position and maintain them in said position.

When it is desired to release the holding means the pressure is applied to the head end of the chucking cylinder causing the piston 38 to move the chucking jaws to be released and also pressure is applied to the conduit 57 in the piston rod and the rod end of cylinder 50. This pressure, since the quill is held stationary, will cause the piston 51 to move forwardly drawing the bearing sleeve with it and releasing the bearing fingers from locking engagement with the quill. Thereafter the quill cylinder will move back readily and out of engagement with the work.

If it is desired the hydraulic fluid may be used to lubricate the tailstock spindle mechanism. As shown in Fig. 4 two conduits 59 are extended through the tailstock into the oil-receiving groove 60 disposed about the sleeve. A solenoid controlled valve 61, connected in the electrical circuit for actuating the holding means, will connect the conduits to the pressure line momentarily during the operation of the chucking button for closing of the chucking circuit to give a squirt of fluid to the spindle for each operation thereof as will be more fully explained in connection with the eletctrohydraulic circuits.

If the locking feature is not required the bearing sleeve may be mounted in the tailstock for adjustment longitudinally therein to cause the bearing fingers to be moved along the cam ring and into engagement with the quill to take up any play which might occur. This adjustment may be made in many ways, for example in Fig. 5, the tailstock bore 44 is threaded at 62 and the sleeve 43 is threaded at 63. A nut 64 is rotatable on the sleeve and threaded into the tailstock and a nut 65 threaded on the sleeve clamps the nut against a shoulder 66 on the sleeve. When it is desired to take up wear, nut 65 is loosened and a wrench is applied to the portion 67 of the nut 64 and it is turned to draw the sleeve back and move the fingers in. Then the nut 65 is tightened and locks the sleeve in position.

Top tool carriage

The present invention provides a novel tool carriage which is mounted on the top bed for longitudinal movement therealong by a piston 68 operating in cylinder 69 (Fig. 9) and connected to the carriage by a piston rod 70 and an adjustable connector 71.

The carriage, as shown in Figs. 1, 6 and 7 is of simple construction having a relatively few parts which may be readily assembled and is capable of positive action and adjustment. The carriage comprises a main carriage body 72 slidably mounted on the ways 29 on the top bed. The body portion 72 is provided with a cavity 73 which is closed by an end plate 74 to which is fixed a piston rod 75 having a piston 75a operating in the cylinder 76 in a cylinder block 77 disposed in the cavity and connected to the tool slide 78 on the carriage to move the same.

The tool slide 78 is slidably mounted on the main carriage body by means of a dovetail rib 79 fitting into cooperating ways 72a on the body as shown in Fig. 7 and carries a cutting tool 80 thereon. The tool slide 78 is adjustably connected to the cylinder block by means of a threaded rod 81 rotatably carried by the slide and having threaded engagement with a bore 82 in the cylinder block. By rotating the rod 81 the tool slide is adjusted with respect to the cylinder block so that subsequent movement thereof, within the stroke of the cylinder on the piston, will move the tool through the required path. After the slide is adjusted with respect to the cylinder block it is locked in position by wedge block 83, positioned in dovetail slot 77a on the cylinder block and drawn into locked relation by bolts 84.

In order to control the position of the tool slide during its reciprocation the cylinder block has mounted on the bottom thereof a roller 85 adapted to engage the top of a template or cam bar 86 mounted on the face of the top bed.

While the roller 85 may be mounted in many ways it is at present preferred carried by a block 86 disposed in a transverse bore 87 at the end of the cylinder block and secured in place by a clip or latch 88 extending transversely of the bore and into a recess 89 in the block as shown in Fig. 6 where it is locked by bolt 90.

The tool slide is preferably provided with an aperture 91 covered by a spring pressed plate 92 and through which access may be had to the roller assembly and locking means.

The roller 85 is yieldably held in engagement with the template or cam bar by a predetermined fluid pressure to accurately control the tool thereby throughout its operation. This is accomplished by providing the piston rod with a conduit 93 extending therethrough so that when pressure is applied to the head end of the cylinder through the conduit it will cause the cylinder block to move downwardly and press the roller firmly against the cam bar so that the tool carriage connected thereto will accurately follow the contour of the bar and properly position the tool throughout the cutting cycle.

When it is desired to raise the tool slide, for example during the return stroke of the carriage, fluid is admitted through port 94 into the rod end of the cylinder which causes the cylinder block and attached tool slide to be raised out of engagement with the bar and the tool removed from the work.

A novel means for positioning and adjusting the template or cam bar is provided according to the present invention so that the template or cam bar is firmly secured to the frame. As shown in Figs. 1 and 6 a template or cam bar carrier 95 having an L-shaped cross-section is mounted on the top bed and is provided with longitudinally extending slots 96 through which pass lock bolts 97 for locking the carrier to the top bed in adjusted position. The carrier 95 is adjusted on the bed by loosening upon the lock bolts and shifting it by a pair of adjusting screws 98 which are mounted in blocks 99 secured to the top bed with the screws in abutting relation with the end of the carrier bar so that the carrier bar may be accurately positioned thereby longitudinally of the bed.

The template or cam bar 86 is mounted on the carrier and provided with transverse slots 100 so that it can be adjusted vertically with respect to the carrier bar as required and is locked on the carrier bar by lock screws 101. The vertical adjustment is produced by adjustable means such as bolts 102 disposed between the top of the bottom leg of the L of the L-shaped carrier and bottom of the template or cam bar as shown in Fig. 6.

Thus it will be seen that the cam bar can be readily changed and precisely adjusted for any requirement of the machine and after which it is securely fixed in place to control the movements of the top tool.

Rear tool carriage

The rear tool carriage is slidably supported by the ways 27 of the main bed and is longitudinally positioned and fixed thereon. The cross slide is moved toward and from the work by means of a cam 103 slidably mounted in the body of the rear carriage and reciprocated by a piston 104 operating in the cylinder 105. The piston is connected to the cam bar by a piston rod 106 and an adjustable connection 107.

As shown in Figs. 2, 3, 6 and 8 the rear carriage comprises a main carriage 108 having a cavity 109 in which there is positioned a cylinder block 110 having a cylinder 111 therein in which is disposed a piston 112 fixed to the main carriage body by a piston rod 113 slidably mounted in an end plate 114 on the cylinder block which closes the cylinder.

The cylinder block is adjustably connected to the cross slide 115 on the carriage to move the tool 116 carried thereby toward and away from the work. The cross slide is slidably mounted on the main carriage 108 by means of a dovetail rib 117 fitting in cooperating ways 118 in the main body as shown in Fig. 8. The cross slide is adjustably connected to the cylinder block in a manner similar to that described in connection with the top tool carriage. It has a threaded rod 119 rotatably carried by the slide and having threaded engagement with a bore 120 in the cylinder block. By rotating the rod in either direction the position of the cross slide can be adjusted as required with respect to the cylinder block so that the tool can be moved into proper engagement with the work within the stroke of the cylinder on the piston. After the slide has been adjusted with respect to the cylinder block, it is locked thereto by a wedge block 121 positioned in a dovetail slot 122 on the cylinder block and drawn into locked relation therewith by bolts 123.

In order to control the movement of the cross slide during its cycle of operation, the carriage 108 is provided with a slot 124 extending therethrough which positions and guides the reciprocating cam bar. The cylinder block 110 has a roller 125 mounted thereon and positioned to engage the contoured edge of the cam bar with a rolling contact. As is shown in Figs. 6 and 8 the roller is mounted in a recess 126 in the bottom of the cam block and the roller shaft 127 is secured in place by a set screw 128.

The roller is yieldably held in engagement with the cam bar by means of fluid pressure applied to the head end of the cylinder through port 129 which causes the cylinder block to move and force the roller constantly and with a yielding pressure into engagement with the edge of the cam bar so that the cross slide and tool connected thereto will be accurately controlled throughout the cutting cycle.

When it is desired to change the cam bar or adjust the same, the pressure of the roller thereon may be relieved by connecting the rod end of the cylinder through the port 130 to a pressure line and causing the cylinder block to be reversed and the roller held out of engagement with the cam bar.

Thus it will be seen that the top and rear tool carriages include a relatively few parts, many of which may be interchangeable if desired. The carriage structure is claimed in my copending application Serial No. 51,289, filed September 25, 1948, now abandoned.

Figure 10:
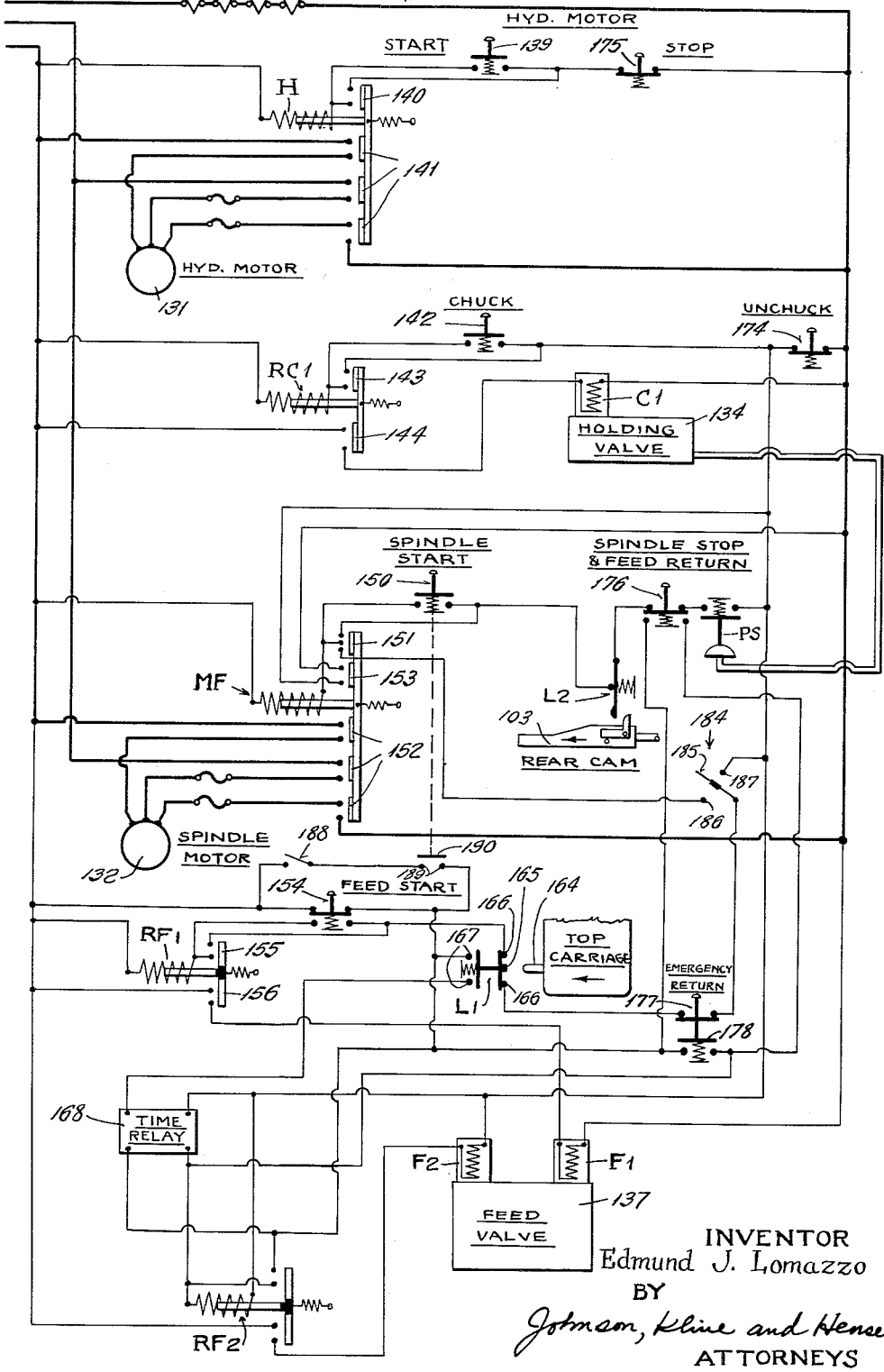
Fig. 10 is the wiring diagram for the electrohydraulic control system.

The interrelation of the various elements such as the driving spindle, working holding chuck on the headstock, tailstock, and tool carriages will be more clearly understood from a consideration of the operation and functioning of the electrohydraulic controlling system and operating means therefor which is diagrammatically illustrated in Figs. 9 and 10.

It will be noted from an inspection of these that the operation of the device is semiautomatic in that it requires manual operation of the various control buttons shown on the control panel 58 in Figure 1 which may be mounted on the front of the machine or provided in any convenient location for the operator of the machine.

In machines of this type which require the attention of an operator to feed and remove the workpieces therefrom, the semiautomatic control can be readily actuated by the operator at the time he makes the work change. This eliminates a large number of the controlling elements present in fully automatic lathes as well as the elaborate programming mechanisms required to carry out the series of operations through a complete cycle. While the various operations are each manually controlled by the operation of push buttons, sufficient interlocks are provided through the various circuits to prevent operation of the various elements at times when it would be dangerous for said elements to be operated. These relationships will be clear from a consideration of the operation of the machine through a complete working cycle.

Operation

When the machine is in its starting position the top carriage, top cross slide, rear cross slide, tailstock quill barrel and chuck or mandrel are all in their retracted or start positions. The usual hydraulic pump motor 131, main drive or spindle motor 132, coolant pump motor and lubricating pump motor (the latter two not shown) are at rest. All the valve operating solenoids are de-energized. The spool 133 of the work holding hydraulic valve 134 is spring held in its left-hand position and the two spools 135, 136 of the compound feed valve 137 are spring held in their central or neutral position. Manually operated valve X is so positioned as to connect its pressure port with the head end port 129 of the rear cross slide cylinder 111 so that with application of pressure the cross slide is maintained in operating connection with its actuating cam 103. The manually operable valve 138 is positioned to the left which is the rear cross slide operating position.

To start a cycle of operations the start button 139 is depressed (see electrical diagram, Fig. 10). This closes a circuit through a relay H which, thus energized, causes its armature to close its own holding circuit through contact 140 and the circuit to the hydraulic pump motor through contacts 141. The pump motor drives the hydraulic pump to deliver fluid pressure to all operating parts of the hydraulic system.

The workpiece may now be placed in the machine between the chuck and the tailstock center and the chuck button 142 depressed. This closes a circuit to, and energizes, a relay RC1 which causes its armature to close its own holding circuit through contact 143 and a second circuit through contact 144 which energizes a solenoid C1 forming a part of the hydraulic work holding valve 134

Referring now to the hydraulic circuit diagram (Fig. 9), the energization of solenoid C1 actuates the pilot valve 145 of holding valve 134 to admit fluid pressure to the left end of valve spool 133 and move it to the right-hand position. This connects the main pressure port A of valve 134 to a line leading to a pressure reducing valve 146 and, by means of a branch line, to a sequence valve 147. Valve 147 is also connected by a line to a second pressure reducing valve 148. The spring setting of sequence valve 147 is such, however, that fluid pressure first flows through the valve 146 at reduced pressure, to the head end of the tailstock quill cylinder, through conduit 56, which, because the piston is in a fixed position, moves the quill to the left causing the tailstock center to engage the work and push it into the chuck. Exhaust fluid from the rod end of the quill cylinder passes through conduit 57 to work holding valve 134 and thence to tank.

As the work comes to its final position in the chuck the pressure builds up in the quill cylinder and serves to move the bearing sleeve 43 to lock same in operating position as hereinbefore described. After the quill is thus automatically locked, the build-up pressure then becomes sufficient to move the spool 149 of the sequence valve 147 to the left thus connecting its pressure port to a line leading to the second pressure reducing valve 148. Fluid at reduced pressure than flows through valve 148 direct to the rod end of the chuck operating cylinder 37, moving its piston 38 to the left and, by means of the draw or chuck rod 39 projecting through the spindle, actuating the chuck jaws 40 to grip the workpiece.

As the chuck jaws 40 reach their final position the further building up of the pressure in the chuck cylinder to a predetermined value serves to operate, through a branch line, a pressure switch PS connected in the electrical control circuit of the main or spindle drive motor as shown in Fig. 10 and which is normally open. Until this switch is closed, by pressure in excess of that required to rigidly hold the workpiece, the spindle motor cannot be started. Exhaust fluid from the head end of the chuck cylinder 37 passes to holding valve 134 and to tank.

The workpiece is now in position for the cutting operation and the spindle drive motor is ready to be started.

Referring again to the electrical circuit diagram (Fig. 10) the spindle start button 150 is depressed, closing the main drive control circuit and energizing relay MF. Operation of the armature of relay MF closes its holding circuit through contact 151, the drive motor circuit through contacts 152 (starting the spindle rotation) and an interlock circuit through contact 153 which prevents unchucking the work so long as this circuit is closed and the spindle rotating.

The cutting cycle is now ready to start and the operator depresses feed start button 154 which closes a circuit to relay RF1. Thus energized the relay RF1 causes its armature to close the relay holding circuit through contact 155 and a circuit through contact 156 to solenoid F1 mounted on the hydraulic feed circuit compound valve 137.

Referring now to the hydraulic diagram (Fig. 9) energization of solenoid F1 operates a pilot valve 157, associated therewith, and connects its pressure port to the right end of upper spool 135 and lower spool 136 forming the compound valve 137 and moving them to the left. Pressure of a predetermined value in excess of that required to operate the work holding mechanism is delivered to the pressure port B of the compound valve 137 through counterbalance and check valve 158, having a ball check 158a and pressure operated spool 158b which receives pressure direct from the pump, also at a predetermined value as determined by the setting of the relief valve 159 associated with said pump.

With spool 135 in its left-hand position the pressure port B of valve 137 is connected to a line leading direct to the head end of the top cross slide cylinder 76, through conduit 93 which, because of a fixed piston, causes the tool slide 78 to move to its cutting position and bring its cam roller 85 into operating contact with the template or cam bar 86.

Simultaneously, pressure from valve 137 enters counter-balance and check valve 160 (similar in construction to valve 158) and, flowing freely over its check valve, passes through a line to the head end of the top carriage actuating cylinder 69 causing the piston 68 therein connected to the carriage to move to the left in its feed stroke.

Fluid from the rod end of the top carriage cylinder 69 flows therefrom at a measured rate as determined by the desired setting of a metering or throttle valve 161 in the exhaust line thereby determining the rate of feed or movement of the top carriage to the left.

From the exhaust end of cylinder 69 the fluid, after passing through throttle valve 161, constitutes a secondary pressure line and passes into compound feed valve 137 and manual valve 138 (bearing in mind that both spools 135 and 136 are in the left-hand position). From valve 138 secondary pressure flows through metering and overload valve 162, and thence to the head end of rear carriage cam operating cylinder 105, excess fluid dumping to tank through a self contained by-pass.

The setting of metering valve 162 in the secondary pressure line determines the rate at which rear cam 103 is moved to the left, its feed stroke, and, in conjunction with the cam contour, causes the rear cross slide to perform its cutting or facing operation at a measured rate. Fluid from the rod end of cam cylinder 105 is exhausted through a line to the counterbalance and check valve 163 (similar in construction to valve 153) in a controlled flow and thence to compound valve 137 from which it passes direct to tank. Exhaust fluid from the rod end of the top cross slide cylinder 76 passes direct to and through compound valve 137 to tank.

Thus it will be seen that the movements of the top and rear tools are definitely tied together and synchronized in their operation during the cutting stroke since the movement of the rear cross slide is controlled by and is dependent upon the movement of the top tool carriage, but their interdependent operation of the top and rear tools is only effective during said cutting stroke. During the return stroke the top and rear tools are moved independently of each other as will be described. This enables accurate control of the two carriages through a series of operations since any variation in the operation of the two carriages will not be multiplied or carried over from operation to operation but will be of the same magnitude for each operation.

Upon completion of the cutting stroke a detent finger 164 mounted upon the advancing side of the top carriage strikes the actuating plunger 165 of a double circuit, limit switch L1 adjustably mounted on the frame. One pair of contacts 166 of the switch is normally closed and is connected in the feed-start circuit and the other pair of contacts 167 is normally open and connected in the primary circuit of a standard time delay relay 168 (see electrical diagram). Thus, as the normally closed contacts of limit switch L1 are opened the relay RF1 is deenergized and its armature retracts and breaks the circuit to solenoid F1 on compound feed valve 137, thus deenergizing said solenoid and permitting the plunger of the associated pilot valve 157 to be spring returned to a position whereby its pressure port is closed. The hydraulic line between the right-hand ends of the two spools 135 and 136 is at the same time opened to a tank line thus allowing the spring centralizing means mounted on spools 135 and 136 to move them simultaneously from their left-hand position to central or neutral position in which position the pressure ports of valve 137 are closed and further movement of the top carriage and rear cross slide stopped due to the cutting off of their fluid power.

Referring again to the limit switch L1, shown in the electrical diagram, as the set of contacts 166 is opened by the top carriage at the end of its feed stroke the other set 167 is closed to complete the primary circuit of the time delay relay 168 which, in a manner well known in the art and hence not shown in detail, actuates a self contained holding circuit and, after the elapse of a predetermined time interval, closes a secondary circuit including relay RF2 to initiate the return stroke of the top carriage and cross slide and the rear cross slide. The purpose of this time delay at the end of the cutting stroke and before the retraction of the tools from the work is to permit the work to revolve a number of times while the tools remain at the end of their feed stroke thus cleaning the end of each cut in a smooth line or surface.

When the relay RF2 is energized, its armature moves so as to close its own holding circuit and complete a circuit to solenoid F2 mounted on compound valve 137.

Referring now to the hydraulic diagram, as the solenoid F2 is energized its associated plunger in pilot valve 169 moves to connect its pressure port to lines communicating with the left ends of spools 135 and 136 and moving them from their neutral to their right-hand positions. The pressure port C in valve 137 is thus connected to a line leading directly to the rod end of the top cross slide cylinder 76, retracting it from its cam bar 86 and withdrawing the tools from the work. The exhaust fluid from the head end of cylinder 76 passes freely to tank by flowing through the piston rod into a line connecting it to valve 137 and from there to the tank line. Simultaneously, the pressure port B in valve 137 is connected with a line leading therefrom direct to the rod end of the top carriage actuating cylinder 69 (by-passing metering valve 161 by means of an associated check valve 170). However, the top carriage does not start on its return stroke until the top cross slide has receded from the work because the fluid from the head end of carriage cylinder 76 does not pass freely to tank but must first pass through the counterbalance valve 160 where it is delayed by having to build up sufficient back pressure to shift the spool in this valve to its left-hand position. When this takes place, the exhaust fluid will then flow to and through valve 137 to tank and the top carriage will start and complete its return stroke.

Concurrently with the application of fluid pressure to effect return of the top carriage, and drawing pressure from the same port C in compound valve 137 which effects withdrawal of the top cross slide, fluid pressure flows freely over the check valve forming part of counterbalance valve 163 and into a line connected to the rod end of rear cam cylinder 105 thereby effecting the return of the rear cam 103 towards its starting position and, due to the cam contour, allowing the rear cross slide to withdraw from the work. Exhaust fluid from cam cylinder 105 returns to tank via lines to and through check valve 171, manual valve 138 and compound valve 137. It is to be borne in mind that direct pressure from the pump acts on the head end of rear cross slide cylinder 111 through manual valve X at all times during the operating cycle to maintain its cam roller in operating contact with the rear cam 103.

As rear cam 103 approaches the end of its return stroke a one-way detent 172 pivotally mounted thereon strikes and passes the extended arm 173 of a normally closed limit switch L2 thus momentarily opening the electrical circuit (see Fig. 10) of relay MF which, thus deenergized, allows its armature to retract and break the main drive motor circuit, the holding circuit for relay MF and the interlock circuit which short circuits the unchuck button 174 during such time as the main drive motor is running. The spindle is thus brought to a stop by brake 20 as the main drive motor circuit is broken.

All of the above described "return" movements continue until the various pistons are brought to rest by meeting the heads of their respective cylinders with the pressures effecting these movements fully maintained until such time as the operator chooses to either start a second cutting cycle on the same piece of work or unchuck the work to recover a finished piece and prepare the machine for a second complete work cycle.

If it should be desired to take a second cut on the same workpiece without unchucking same, and bearing in mind that time relay 168, relay RF2 and feed return solenoid F2 are still energized, it is obvious that before a second feed stroke can be initiated the three elements just mentioned must be deenergized. This is accomplished by having the line which supplies current to both the primary and secondary circuits of time relay 168 and to the holding circuit of relay RF2 pass through a second pair of contacts on the feed start button 154, said contacts being normally closed when the button is in normal position and the feed circuit contacts of button 154 are open. Thus when the button 154 is depressed to start the second feed stroke under discussion (after the spindle start button 149 has first been operated) the circuit which energizes time relay 168 and relay RF2 is first broken and the relay deenergized. This in turn breaks the circuit supplying feed return solenoid F2 and allows compound hydraulic valve 137 to move to neutral position. Continued movement of button 154 then closes the feed circuit which energizes relay RF1 and hence the feed solenoid F1. The feed or cutting stroke then starts, progresses and, as it ends, automatically initiates the return stroke and, at its end, stops the spindle rotation as already described.

When it is desired to remove a finished workpiece and bring the machines to a complete stop in its position of rest, the operator depresses the unchuck button 174 which breaks the control circuits to time delay relay 168, relay RF2 and holding valve relay RC1. Deenergization of time relay 168 and relay RF2 merely resets the former for the next cycle and breaks the circuit to solenoid F2 so that compound valve 137 moves to neutral position by means of its centralizing springs acting upon spools 135 and 136. Deenergization of relay RC1 allows its armature to retract and break its holding circuit and the circuit which energized solenoid C1 on holding valve 134.

Referring now to the hydraulic diagram, as solenoid C1 is deenergized the pressure port of associated pilot valve 145 is closed and the line from the left end of spool 133 is connected to a tank line thus allowing the spool to move to its left-hand position under influence of its associated spring. The left-hand position of spool 133 connects the valve pressure port A with a line leading directly to the head end of chuck cylinder 37 and to the rod end of the tailstock quill cylinder 50. Thus the chuck jaws 40 are caused to retract and the tailstock quill to recede from the work permitting it to be removed from the machine. Exhaust fluid from the head end of the tailstock quill cylinder 50 passes through the piston to tank via lines to pressure reducing valve 146 where it is by-passed freely over the lower check valve contained therein, and thence through valve 134. Exhaust fluid from the rod end of chuck cylinder 37 passes to pressure reducing valve 148, where it is freely by-passed over the lower check valve contained therein, thence to sequence valve 147, where it is again by-passed over a self contained check valve, and then to and through valve 134 to tank. As this latter hydraulic circuit from the chuck cylinder is connected to tank the pressure in this line drops and permits pressure switch PS to open in preparation for the next work cycle.

The machine is now completely reset for the new workpiece and the next work cycle with the hydraulic pump motor still running. If it is desired to completely stop the machine the stop button 175 is depressed thus breaking the pump motor control circuit and stopping the hydraulic pump.

An emergency return button 177 is provided in the feed control electrical circuit so that the feed strokes of the top carriage and rear cross slide may be stopped at any time and the parts returned to their start position without stopping the spindle drive motor. As embodied, emergency return button 177, when depressed, breaks the feed control circuit through relay RF1 which in turn breaks the circuit through solenoid F1 on compound valve 137, thus stopping the feed movements of the top carriage and rear cross slide. Coincidentally with the opening of the feed circuit by button 177 a circuit is closed by contact 178 on button 177 which completes a circuit through relay RF2 (by-passing time delay relay 168) which, thus energized, causes its armature to close the relay holding circuit and the circuit through the return feed solenoid F2 the energizing of which initiates the return strokes of the top carriage and cross slide and the rear cross slide as already described.

Provision is made in the machine by use of a second pair of contacts on the emergency stop and feed return button 176 in the spindle drive motor control circuit, so that the operator, by depressing same, can stop the spindle rotation and initiate the feed return stroke at any time in the cycle. As may be seen from inspection of the electrical diagram when button 176 is depressed the spindle drive motor circuit is first opened and the spindle rotation stopped and the circuit through the second pair of contacts simultaneously closed which initiates the feed return stroke as previously noted in the description of contactor 178 of emergency return button 177.

When it is desired to change the rear cam 103 for any reason the position of manual valve X is reversed from the position shown in Fig. 9 so that fluid pressure enters the rod end of rear cross slide cylinder 111 and the head end is opened to a tank line. With the pressure thus removed from the cylinder head the rear cross slide may be moved away from the cam 103.

If use of the rear carriage and cross slide is not required on a particular workpiece they may be blocked out of the hydraulic system by shifting manual valve 138 from the left to the right-hand position (see Fig. 9). In this position the secondary pressure from valve 137 into valve 138 is connected to a tank port in the latter valve and the line through metering valve 162 to rear cam cylinder 105 is blocked.

For convenience in assembling the machine the valves 134, 146, 147 and 148 associated with the work holding hydraulic circuit, may be mounted as a unit on a manifold panel J, as indicated in Fig. 9, and secured in front of the machine base beneath the headstock in the rear of cover plate 180. Pressure switch PS may also be mounted on panel J if desired. In like manner the feed control valves 137, 158, 160 and 163 may also be mounted on a manifold panel K and secured in the rear of the machine base beneath the headstock and in the rear of cover plate 181.

The valve 137 is herein illustrated as a single block with the three spools mounted therein but it is to be understood that three separate valves may be used if desired.

When the feature of lubricating the tailstock spindle is incorporated in the machine whereby lubrication of the tailstock mechanism is automatically accomplished at regular operating intervals a two-way, solenoid controlled valve 61 is provided having its pressure port connected directly to a hydraulic pump pressure line and its solenoid 183 electrically connected in the chuck control circuit in such a way that every time chuck starting button 142 is depressed the solenoid 183 is energized and momentarily opens the hydraulic pressure port of valve 61 to a line leading to the tailstock lubricating system and thus delivers a shot of oil to the system.

If desired a selector switch 184 may be included in the interlock for the feed circuit. During normal operations the movable blade 185 is moved into engagement with contact 186 and the machine operates as previously described. When it is desired to operate the carriages only without the spindle, as when setting up the machine, the movable blade is moved into engagement with contact 187. This completes the circuit and permits repeated operations of the carriage as may be required during the setting up.

Under some circumstances it may be desired to control the spindle motor and feed simultaneously. This is accomplished by closing selector switch 188 in a shunt circuit about the feed start button 154. This circuit includes contacts 189 which are closed by a contactor 190 mechanically connected to spindle start button 150 so that feed relay RF1 is energized simultaneously with the energization of the motor relay MF.

Variations and modifications may be made within the scope of this invention and portions of the improvements may be used without others.

I claim:
1. In a machine tool, tool carrying members movable through a cutting and return cycle; and hydraulic means including a single source of fluid under pressure, a piston and cylinder means for each member, means connecting said cylinders in series with said source during the entire simultaneous cutting stroke of said members, and means connecting each of said cylinders independently to said source during the entire return stroke of each member for moving one of said members in response to movement of the other member during the cutting strokes thereof and for moving the members independently of each other during the return stroke.

2. In a machine tool, means for supporting a workpiece; top and rear carriages movable relative to the workpiece for performing a cutting operation thereon; and hydraulic means including a single source of fluid under pressure, a piston and cylinder means for each member, means connecting said cylinders in series with said source during the entire simultaneous cutting stroke of said members, and means connecting each of said cylinders independently to said source during the entire return stroke of each member for synchronously moving said one of said carriages in response to movement of the said other carriage during the cutting stroke thereof.

3. In a lathe, a spindle having an electrically controlled driving means therefor; switch means having start and stop buttons connected in the control circuit of said drive means; tool carriages; means separate from the drive means for operating the tool carriages through a predetermined cycle from a starting position; and means controlling the last-named means actuated by and in response to the actuation of the stop button for the drive means to stop the drive means for automatically returning the carriages to starting position.

4. In a lathe having a spindle having an electric driving means, hydraulically operated work supporting means having a holding and release cycle, and hydraulically operated tool feeding means for moving tools from a predetermined initial position through a feeding and return cycle; an electrohydraulic operating system for said driving means, work supporting means and tool feeding means including an electric circuit having separate manually operated switch means for starting and stopping the spindle drive; an electric circuit having separate manually operated switch means for actuating and releasing the work supporting means; an electric circuit having a separate manually operated switch means for starting and stopping a cycle of the tool feeding means; means in the work supporting circuit actuatable to render the spindle drive circuit inoperative until the work supporting circuit is operative to support the work to prevent the spindle being operated until the work is supported; means in the drive circuit operative upon energization of said circuit for shunting the manually operable switch means for the working supporting means and preventing release of the work while the spindle is being driven; and means operative upon operation of the releasing switch for the work supporting means for returning the tool feeding means to initial position.

5. In a machine tool, top and rear tool slides carrying tools through a cutting and return cycle; and hydraulic means including a single source of pressure, a piston and cylinder means connected to operate each tool slide, means connecting the pressure end of the top tool slide operating cylinder to the pressure source and the exhaust end of the top tool slide operating cylinder to the pressure end of the rear tool slide actuating cylinder for operating the rear tool in response to movement of the top carriage during the entire cutting stroke of the tools and means connecting the cylinders independently to the single source of power for moving the top and rear tools independently of each other during the entire return stroke, said hydraulic means including means for selectively rendering the rear tool operating means inoperative.

6. In a hydraulic system for a machine for operating from a starting position a plurality of cutting tools during simultaneous working and return strokes thereof, the combination of a cylinder having a piston therein and means connecting said piston to one of said tools to move the same through a cutting stroke; a second cylinder having a piston and means connecting the second piston to a second tool to move the same through a cutting stroke; a single source of fluid under pressure; means connecting the cylinders in series with said source of fluid under pressure during the entire simultaneous cutting strokes of the tools including a hydraulic connection extending between the exhaust end of the cylinder for the first tool and the pressure end of the cylinder for the second tool whereby the second tool is moved in accordance with and in response to movement of the first tool; and means simultaneously separately connecting the cylinders to the source of fluid under pressure during the entire return stroke thereof whereby the tools are independently returned to starting position.

7. In a hydraulic system for a machine for operating from a starting position a plurality of cutting tools during simultaneous working strokes thereof, the combination of a cylinder having a piston therein and means connecting said piston to one of said tools to move the same through a cutting stroke; a second cylinder having a piston and means connecting the second piston to a second tool to move the same through a cutting stroke; a single source of fluid under pressure; means connecting the cylinders in series with said source of fluid under pressure during the entire simultaneous cutting strokes of the tools including a hydraulic connection extending between the exhaust end of the cylinder for the first tool and the pressure end of the cylinder for the second tool and having a metering valve disposed in said connection whereby the second tool is moved in a predetermined relation with and in response to movement of the first tool; and means simultaneously separately connecting the cylinders to the source of fluid under pressure during the entire return stroke thereof whereby the tools are independently returned to starting position.

8. In a hydraulic system for a machine for operating from a starting position a plurality of tools during simultaneous working and return strokes thereof, the combination of a first cylinder having a piston therein and means connecting said piston to one of said tools to move the same; a second cylinder having a piston and means connecting the second piston to a second tool to move the same; a single source of fluid under pressure; electrohydraulic means for controlling the simultaneous working and return strokes of said tools including an electrical circuit and electrically controlled valve means connecting the first and second cylinders in series with said source of fluid under pressure during the entire simultaneous cutting strokes of the tools including a hydraulic connection extending between the exhaust end of the cylinder for the first tool and the pressure end of the cylinder for the second tool whereby the second tool is moved in accordance with and in response to movement of the first tool; and electrically controlled means, including timing means, actuated by one of the tools at the end of the working stroke for moving the electrically controlled valve means and connecting the cylinders simultaneously separately to the source of fluid under pressure after a predetermined operation of the timing means to effect the entire return strokes of said tools whereby the tools are independently returned to starting position.

9. In a hydraulic system for a machine for operating from a starting position a plurality of tools during simultaneous cutting and return strokes thereof, the combination of a cylinder having a piston therein and means connecting said piston to one of said tools to move the same; a second cylinder having a piston and means connecting the second piston to a second tool to move the same; a single source of fluid under pressure; electro-hydraulic means for controlling the simultaneous working and return strokes of said tools including an electric circuit and electrically controlled valve means connecting the first and second cylinders in series with said source of fluid under pressure during the entire simultaneous cutting strokes of the tools including a hydraulic connection extending between the exhaust end of the cylinder for the first tool and the pressure end of the cylinder for the second tool whereby the second tool is moved in accordance with and in response to movement of the first tool; electrically controlled means, including timing means, actuated by one of the tools at the end of the working stroke for moving the electrically controlled valve means and connecting the cylinders separately to the source of fluid under pressure after a predetermined operation of the timing means to effect the simultaneous entire return strokes of said tools whereby the tools are independently returned to starting position; and emergency return means connected in the electric circuit and when actuated operable independent of the electrically controlled means to return the tools to starting position without operation of the timing means.

References Cited in the file of this patent

UNITED STATES PATENTS

| | | |
|---|---|---|
| 1,821,331 | Svenson | Sept. 1, 1931 |
| 1,933,224 | Smith | Oct. 31, 1933 |
| 2,008,012 | Foster | July 16, 1935 |
| 2,078,696 | Svenson | Apr. 27, 1937 |
| 2,111,134 | Allin | Mar. 15, 1938 |
| 2,112,466 | Maloon | Mar. 29, 1938 |
| 2,118,020 | Curtis | May 17, 1938 |
| 2,166,085 | Wood | July 31, 1939 |
| 2,183,430 | Monroe | Dec. 12, 1939 |
| 2,186,379 | Harrington et al. | Jan. 9, 1940 |
| 2,235,079 | Mobins | Mar. 18, 1941 |
| 2,382,023 | Podesta | Aug. 14, 1945 |
| 2,389,746 | Sparks et al. | Nov. 27, 1945 |
| 2,475,298 | Sloane | July 5, 1949 |